United States Patent
Grasso

(10) Patent No.: US 7,118,819 B2
(45) Date of Patent: Oct. 10, 2006

(54) COOLANT MIXTURE SEPARATOR ASSEMBLY FOR USE IN A POLYMER ELECTROLYTE MEMBRANE (PEM) FUEL CELL POWER PLANT

(75) Inventor: Albert P. Grasso, Vernon, CT (US)

(73) Assignee: UTC Fuel Cells LLC, South Windsor, CT (US)

( * ) Notice: Subject to any disclaimer, the term of this patent is extended or adjusted under 35 U.S.C. 154(b) by 438 days.

(21) Appl. No.: 10/171,854

(22) Filed: Jun. 17, 2002

(65) Prior Publication Data

US 2003/0232228 A1    Dec. 18, 2003

(51) Int. Cl.
*H01M 2/00*   (2006.01)
*B01D 19/00*   (2006.01)

(52) U.S. Cl. .............. 429/19; 96/208; 96/216; 96/210; 96/212; 210/188; 429/34; 95/261

(58) Field of Classification Search ......... 96/204, 96/208, 210–216; 95/261; 210/188; 429/26, 429/34, 19
See application file for complete search history.

(56) References Cited

U.S. PATENT DOCUMENTS

| | | | | |
|---|---|---|---|---|
| 3,771,288 | A * | 11/1973 | Wisman et al. | 96/210 |
| 4,555,253 | A * | 11/1985 | Hull et al. | 96/166 |
| 6,103,411 | A | 8/2000 | Matsubayashi | 429/17 |
| 6,176,903 | B1 * | 1/2001 | Wamsiedler | 96/208 |
| 6,365,291 | B1 | 4/2002 | Margiott | 429/25 |
| 6,428,916 | B1 * | 8/2002 | Grasso et al. | 429/13 |
| 6,528,194 | B1 * | 3/2003 | Condit et al. | 429/26 |

FOREIGN PATENT DOCUMENTS

| | | |
|---|---|---|
| JP | 10-074530 | 3/1998 |
| JP | 2000-12053 | 1/2000 |
| JP | 2000-082479 | 3/2000 |
| JP | 2002-110209 | 4/2002 |
| WO | WO96/37920 | 11/1996 |

* cited by examiner

*Primary Examiner*—Tracy Dove
(74) *Attorney, Agent, or Firm*—William W. Jones

(57) ABSTRACT

A liquid-gas separator assembly is used in separating gas bubbles from a liquid coolant which liquid coolant is used in a polymer electrolyte membrane (PEM) fuel cell power plant. The assembly includes a cylindrical housing containing a central tube which is surrounded by an annular chamber. The annular chamber is defined by the outer surface of the central tube and the inner surface of the cylindrical housing. An inlet line injects a stream of the coolant from the fuel cell stack area of the power plant into the bottom of the central tube in a tangential flow pattern so that the coolant and gas bubble mixture swirls upwardly through the central tube. The swirling flow pattern of the coolant and gas bubble mixture causes the gas bubbles to separate from the liquid coolant so that the gas in the mixture will migrate to the central portion of the swirl tube and the liquid component of the mixture will centrifugally migrate to the inner wall of the swirl tube. The gaseous component of the separated mixture is then expelled from the housing through an outlet in the upper portion of the housing, and the coolant liquid descends through the annular chamber to the bottom of the housing where the coolant liquid will be returned to the cell stack area of the power plant. The gas bubbles may include reactant from either the cathode or the anode. The separator of this invention is particularly useful in mobile applications since it is less sensitive to vehicular acceration forces.

2 Claims, 2 Drawing Sheets

COOLANT MIXTURE SEPARATOR ASSEMBLY FOR USE IN A POLYMER ELECTROLYTE MEMBRANE (PEM) FUEL CELL POWER PLANT

TECHNICAL FIELD

The present invention relates to a separator assembly for separating gas bubbles from the liquid constituent of a coolant fluid which has been used to cool a PEM fuel cell power plant cell stack. The coolant fluid is drawn from the power plant cell stack and is pumped to the separator. Gas bubbles that have become entrained in the coolant fluid during cooling of the cell stack are removed from the coolant liquid in the separator. The gas bubble-free coolant liquid is then returned to the power plant system and subsequently to the cell stack.

BACKGROUND OF THE INVENTION

The temperature of the fuel cell stack portion of a PEM fuel cell power plant is regulated by a coolant stream which absorbs heat from the cells in the stack. In PEM type fuel cell power plants that utilize porous plate water transfer elements which are directly exposed to the liquid coolant, the coolant will also will entrain gas bubbles which are derived from the porous water transfer plates as the coolant stream passes through the cell stack area of the power plant. U.S. Pat. No. 5,503,944 dated Apr. 2, 1996, which is incorporated herein in its entirety, discloses a PEM fuel cell power plant which includes porous water transfer plates which absorb water that is formed on the cathode side of the electrolyte membranes in the fuel cells. The absorbed water passes through the porous plates and enters the circulating coolant stream which is used to control the temperature of the cells. The cathode water also includes air bubbles that are passed through the porous plates and thus enter the coolant stream. A similar phenomenon on the anode side causes gaseous fuel constituents to pass through its porous water transfer plate. Since the coolant stream is constantly recycled through the fuel cell stack, the amount of gas entrained in the coolant stream will increase with time. The resultant build up of gas bubbles which are entrained in the coolant stream will adversely affect the cooling capacity of the coolant stream. Entrained gas bubbles also adversely affect the ability of the coolant pump to recirculate the coolant liquid by forming a two phase mixture in the coolant liquid thereby rendering the coolant liquid difficult to pump. Therefore, the gas bubbles should be removed from the coolant stream during the recycling of the coolant stream in the power plant in order to maintain the ability of the coolant stream to regulate the operating temperature of the power plant. Separating the gas bubbles from the coolant liquid will also allow the use of simpler, lower cost, longer life coolant recirculation pumps with a net positive suction head, such as a centrifugal type pump.

DISCLOSURE OF THE INVENTION

This invention relates to a system and method for removing gas bubbles which are entrained in a recirculated coolant stream in a PEM fuel cell power plant, which power plant employs porous anode and cathode water transfer plates, the cathode transfer plate being operative to transfer product water from the cathode to the coolant stream in the power plant. The system and method of this invention involve the use of a vortex separator mechanism which serves to separate entrained gas bubbles from a recirculating liquid coolant stream. The coolant stream, after it exits the fuel cell area of the power plant, is drawn into the separator. The gas bubble-coolant liquid mixture enters the bottom of the separator and is vortexed upwardly through a central portion of the separator where the liquid coolant in the mixture is flung radially outwardly in the separator by centrifugal force, and the entrained gas bubbles remain in a central funnel in the vortex. The separated funneled gas bubble stream is drawn out of the separator through a central upper outlet. The liquid coolant is gravimetrically removed from the separator through an outer annular passage in the separator. The liquid coolant is then pumped out of the separator and returned to the fuel cell stack portion of the power plant.

The separator of this invention is structured as follows. The separator includes a cylindrical housing having a lower end and an upper end. The lower end of the separator includes a manifold which receives the coolant liquid-gas bubble mixture from the fuel cell stack area of the power plant. The housing includes an inner tubular part which communicates with the manifold, and an outer annular part which communicates with the upper end of the inner tubular part of the separator. An inlet tube opens into the manifold in a tangential fashion. The inlet tube introduces the liquid coolant and gas bubble mixture into the manifold in a swirling flow stream which creates a vortex flow pattern in the manifold. The swirling mixture flows upwardly into the inner tubular part of the separator. The mixture separates into a radially outward liquid component and a central gas component. The outer liquid component flows upwardly along the wall of the inner tubular part until it reaches the top of the inner tubular part whereupon it cascades over the top of the inner tubular part and descends through the outer annular part of the separator to the bottom of the separator where it is pumped out of the separator by an upstream pump. The liquid coolant is then pumped through a heat exchanger where its temperature is lowered to a temperature suitable for cooling the fuel cell stack in the power plant, to which it is returned. The central gas stream in the tubular part of the separator is vented from the separator housing through a top wall of the housing. The liquid coolant is recirculated through the separator after each cooling pass through the fuel cell stack.

It is therefore an object of this invention to provide a PEM fuel cell power plant assembly which includes porous water transfer plates that wick water away from the cathode side of the cells in the power plant.

It is an additional object of this invention to provide an assembly of the character described wherein the cathode water is wicked through the porous plates into a coolant stream which controls the temperature of the fuel cells in the power plant.

It is a further object of this invention to provide an assembly of the character described which includes a separator that separates entrained gas bubbles from the liquid coolant stream after the coolant stream leaves the fuel cell area of the power plant.

It is another object of this invention to provide an assembly of the character described wherein the separator creates an upwardly directed swirling vortex flow pattern in the coolant-gas mixture that centrifugally separates the liquid coolant from the gas in the mixture.

These and other objects of the invention will become more readily apparent from the following detailed description thereof when taken in conjunction with the accompanying drawings in which:

SPECIFIC MODE FOR CARRYING OUT THE INVENTION

Figure 1:
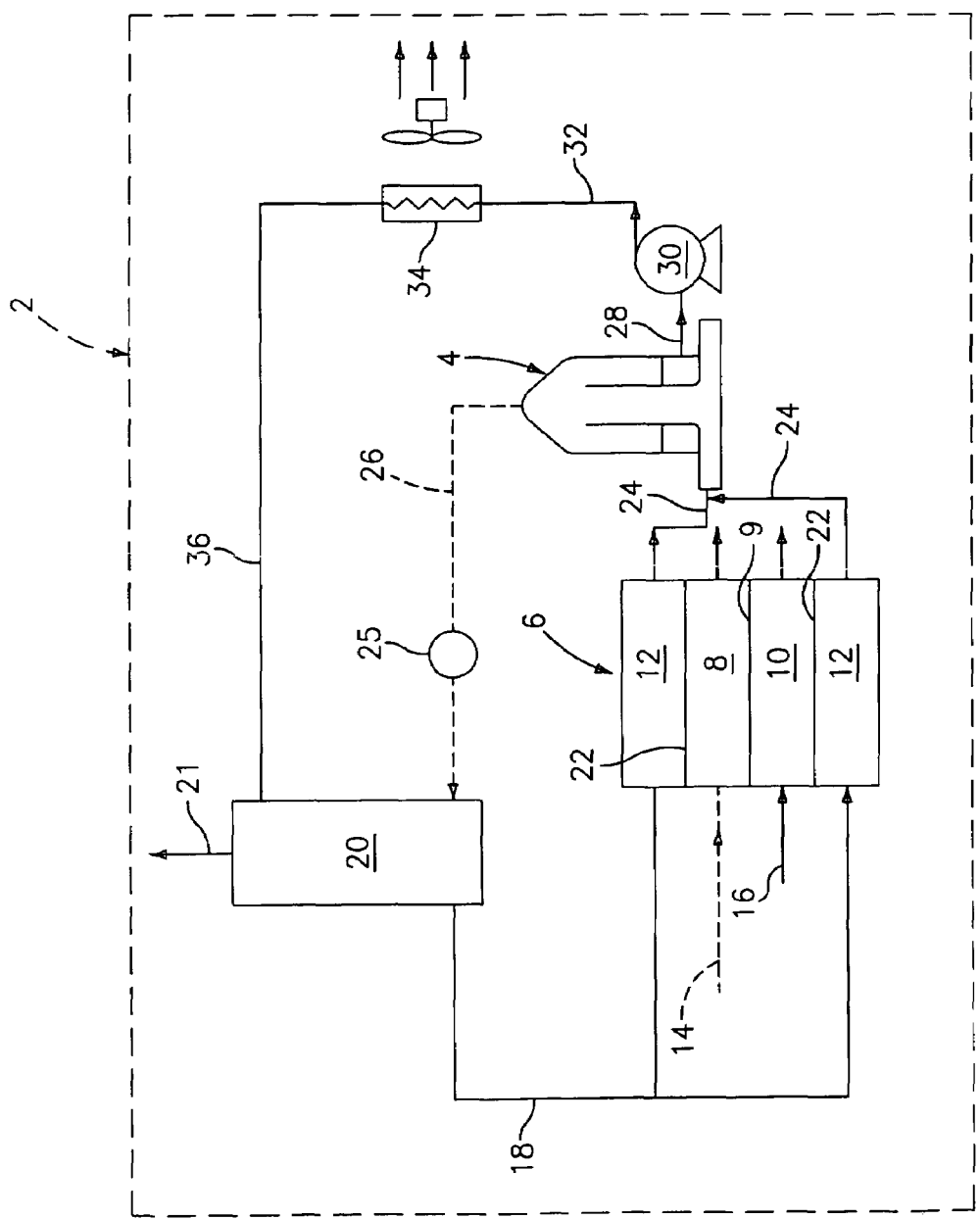
FIG. 1 is a schematic view of a fuel cell power plant which includes a separator that is formed in accordance with this invention.

Referring now to the drawings FIG. 1 is a schematic view of a PEM fuel cell power plant system which is designated generally by the numeral 2, and which incorporates the gas-liquid separator assembly 4 of this invention. The power plant system 2 includes a PEM cell stack 6 having a cathode side 8 and an anode side 10 which are disposed on opposite sides of the electrolyte membrane 9. An operating temperature-controlling cooler 12 is disposed on the cathode side 8 and on the anode side of an adjacent cell of the stack 6 gas is fed into the cathode side 8 via line 14 and fuel is fed into the anode side 10 via line 16. The fuel can be reformed natural gas, or some other hydrogen-containing gas. A liquid coolant is fed into the cooler 12 via a line 18 from a coolant accumulator 20. As noted above, water which forms on the cathode side 8 of the electrolyte 9 is transported into the cooler 12 along with gas bubbles through a porous plate 22, and fuel gas is likewise transported to the coolant stream from the anode side of an adjacent cell. The coolant exits from the cooler 12 through a line 24 which leads to the separator assembly 4. The entrained gas bubbles are separated from the liquid coolant in the separator assembly 4 in a manner which will be described in greater detail hereinafter, and the separated gas component is withdrawn from the separator assembly 4 through a line 26 which is connected with the accumulator 20. A vacuum pump 25 is operative to draw the gas out of the separator assembly 4. Gas separated from the coolant stream is then vented from the accumulator 20 through line 21. The gas-free liquid coolant exits the separator assembly through a line 28. A pump 30 moves the coolant through the line 28 and into a line 32 which leads to a heat exchanger 34 where the temperature of the coolant is lowered to an appropriate temperature for cooling the stack 6. The coolant is transferred from the heat exchanger 34 through a line 36 back to the accumulator 20 so that it can be reused to cool the stack 6.

Figure 3:
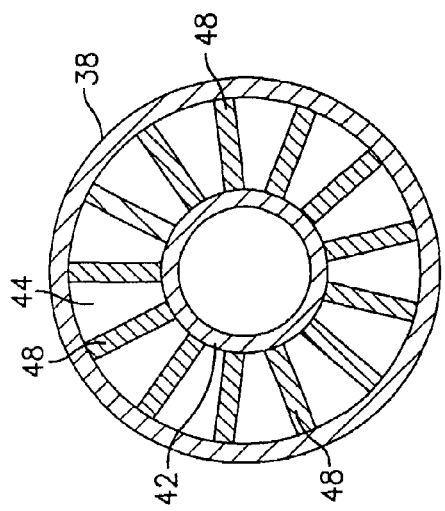
FIG. 3 is a cross sectional view of the separator assembly taken along line 3—3 of FIG. 2.
Figure 4:
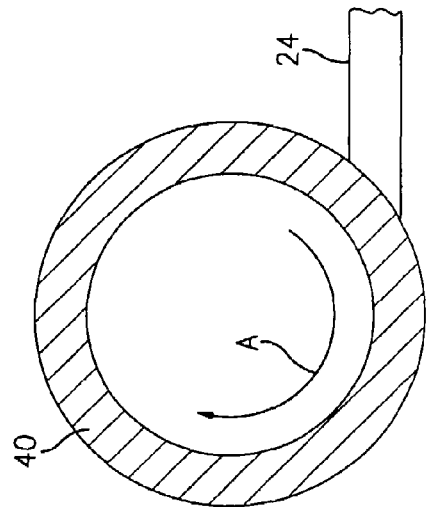
FIG. 4 is a cross sectional view of the separator assembly taken along line 4—4 of FIG. 2.
Figure 2:
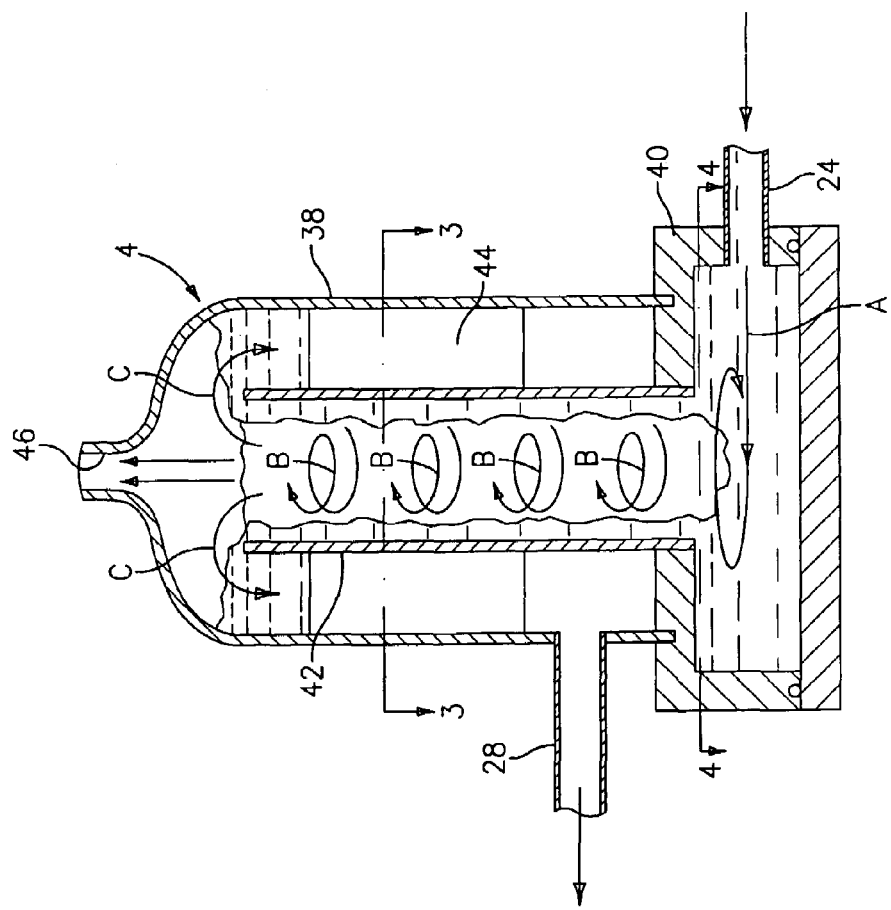
FIG. 2 is a sectional view of the separator assembly formed in accordance with this invention.

Referring now to FIGS. 2–4, details of the separator assembly 4 are shown. The separator assembly 4 includes a cylindrical housing 38 which is mounted on an cylindrical manifold base 40. The line 24 enters the manifold base 40 tangentially as is shown in FIG. 4. The coolant-gas mixture thus forms a swirling flow pattern in the manifold base 40 as indicated by the arrow A as shown in FIGS. 2 and 4. The assembly 4 also includes an inner tubular member 42 which is inwardly spaced from the side wall of the housing 38 so as to form an annular space 44 between the outer surface of the member 42 and the inner surface of the housing 38. The bottom of the tube 42 opens into the interior of the manifold 40 and the swirling coolant liquid-gas mixture is impelled upwardly through the tube 42 and swirls upwardly through the tube 42 as indicated by the arrows B. As the mixture swirls upwardly through the tube 42, the liquid constituent will centrifugally separate from the gas constituent so that the liquid constituent swirls upwardly on the inner surface of the tube 42, and the gas constituent swirls upwardly in the central portion of the tube 42. The separated gas constituent is ejected from the housing 38 through a central opening 46 which is connected to the line 26 shown in FIG. 1.

The separated liquid coolant constituent spills over the upper edge of the tube 42 and flows downwardly through the annular space 44, as indicated by the arrows C. The liquid coolant constituent is then pumped out of the annular space 44 through the line 28. As seen in FIG. 3, the annular space 44 can be provided with radial fins 48 which will convert the liquid swirling flow to a linear flow. Thus the coolant liquid will quiescently pool in the lower portion of the annular space 44 prior to being withdrawn from the separator 4 through the line 28.

It will be readily appreciated that the separator of this assembly can efficiently separate a gas-liquid mixture into separate components thereby removing the gas from the liquid. The separator is particularly useful in removing entrained gas bubbles from a liquid coolant stream in a PEM fuel cell power plant assembly. By removing the entrained water bubbles from the liquid coolant, the cooling capacity of the coolant is improved, and the coolant can be recirculated back to the cell area of the power plant and reused to control the temperature of the cells in the power plant. Removal of the gas bubbles also enables the use of simpler, lower cost, long life recirculating pumps with improved suction heads. The hydraulic water head available to the coolant pump is maximized by the up-flow vortex pattern, thus reducing the pump's net positive suction head requirement. Use of the up-flow vortex flow pattern also enables the separator to be quite compact, essentially the same size as a coffee can, which is about six inches high and about five inches in diameter. These dimensions are approximate and are not intended to limit the invention as claimed.

Since many changes and variations of the disclosed embodiment of the invention may be made without departing from the inventive concept, it is not intended to limit the invention otherwise than as required by the appended claims.

What is claimed is:

1. An assembly for separating a liquid component from a gas component in a liquid-gas mixture, said assembly comprising:
    a) an vertically axially elongated housing which is mounted on a manifold base, a first passage opening into said manifold base for introducing the liquid-gas mixture into said manifold base in a manner which creates an upwardly swirling stream of the liquid-gas mixture in the manifold base;
    b) a tubular member mounted in said housing, said tubular member opening into said manifold base so as to receive the upwardly swirling stream of the liquid-gas mixture from the manifold base;
    c) an annular space interposed between said tubular member and an inner wall of said housing, said annular space being operative to receive a separated liquid component of the mixture from said tubular member, and said annular space being provided with radial fins which null swirling flow patterns in the liquid component as the latter descends through said annular space and said annular space being operative to gravimetrically channel said separated liquid component downwardly therethrough; and
    d) a vent in said housing, said vent being operative to remove gas from the housing, which gas has been separated from the liquid-gas mixture in the housing.

2. The assembly of claim 1 further comprising an outlet in a lower end of said annular space, which outlet is operative to remove the separated liquid component from said housing.

* * * * *